3,293,467
SINGLE-PHASE ELECTRIC MOTORS
Robert Favre, Lausanne, Switzerland, assignor to Golay,
Buchel & Cie S.A., Malley, Switzerland, a firm
Filed Aug. 24, 1964, Ser. No. 391,444
Claims priority, application Germany, Aug. 24, 1963,
G 38,545
1 Claim. (Cl. 310—156)

Single-phase electric motors with magnetised rotors are known, in which the commutation of the stator winding is effected by electronic means by way of a member rotating with the rotor.

The commutator connection is then preferably formed of at least one power stage operating with semi-conductors, which comprises a detector excited from the said member to the rotor electro-magnetically, photo-electrically or by other known means. This detector controls the power stage, and with it the periodical excitation of the stator winding.

These single-phase motors, which are distinguished by simple construction and good efficiency, have however the disadvantage that they are not self-starting, unless one provides some suitable additional means for the self-starting, since the rotor may assume positions of rest in which, upon excitation of the field winding, no torque is exerted upon it.

In order to prevent the rotor stopping in such a "dead zone" when the motor is switched off, it has already been proposed to arrange the curved surface of the stator pole shoes eccentrically in relation to the axis of the rotor in such a way that the air-gaps between the rotor periphery and the stator pole faces decrease progressively along the rotor periphery. The result is thereby attained that the rotor, in its position of rest, is always so adjusted that its polar axes are directed towards the region of the smallest air-gap, and is therefore turned out of the dead zone, which is determined by the coincidence of the polar axes of the stator and the rotor. Such a motor, already suggested, is diagrammatically shown in FIGURE 1 of the accompanying drawings. The surface of the rotor poles may of course also be correspondingly eccentrically located to the concentric surface of the stator poles.

Figure 2:
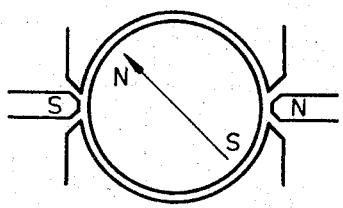

Another solution, likewise already suggested, which is illustrated in FIGURE 2 of the accompanying drawings, consists in arranging additional magnets in the neighbourhood of the rotor periphery, in such a way that the rotor is always moved in a position of rest outside the dead zone.

Whilst one of these suggested solutions requires a special construction and arrangement of the stator poles, and the other solution requires the employment of additional magnets, this invention is based on the problem of preventing a position of rest of the rotor within the dead zone with stator poles of optimum geometry arranged symmetrically in relation to the rotor, without employing additional constructional members.

This is attained, according to the invention, by the feature that the stator is diametrally split along its inter-polar axes, so that the reluctance between adjacent stator poles is greater than the reluctance along a stator pole shoe.

By this simple measure the result is attained that the magnetised rotor, in its position of rest, always adjusts itself with its polar axes in the direction of the inter-polar stator-pole axes, and therefore outside a dead zone, since the magnetic rotor field tends to close by way of a magnetic path of minimum reluctance. The magnetic field is sufficiently strong to overcome inertia and friction in the two sectors to bring the rotor in the desired rest position away from the dead position. In the said position of rest, the rotor field closes directly by way of the air-gap and by way of each stator pole shoe, since the reluctance of this magnetic circuit is according to the invention smaller than that of a magnetic circuit extending over the boundary surfaces of adjacent stator poles.

Figure 1:
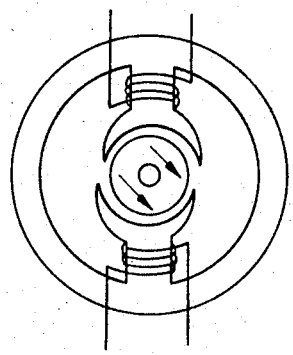
Figure 3:
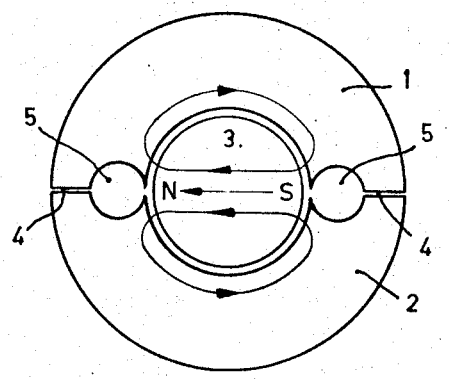

Whilst FIGURES 1 and 2, as mentioned, show two solutions that have already been suggested, FIGURE 3 of the accompanying drawings illustrates diagrammatically a motor according to the invention. Here the motor comprises a rotor 3, diametrally magnetised in the direction of the arrow, and a two-pole stator which is diametrally split along its inter-polar axes, with the formation of small gaps 4, into two halves 1 and 2. The rotor 3 may be either of permanent magnet, with the poles N and S, or an electro-magnetically excited rotor with corresponding poles. The recesses 5 provided between the stator poles serve for putting in the stator winding, not shown.

When the motor is out of operation, the rotor 3 assumes the position of rest illustrated, in which its polar axis coincides with the inter-polar axis of the stator poles, its field closing, as diagrammatically indicated by arrow lines, directly by way of one stator pole in each case. This magnetic circuit has a lower reluctance than a magnetic circuit present in any other position of the rotor and including the transition between the stator poles by way of one of the gaps 4.

The stator according to the invention can be constructed with poles of optimum geometry, that is to say, with poles extending practically over the entire periphery of the rotor, and closely approaching one another, since the whole of the region around the rotor is available for the stator poles. In the example illustrated in FIGURE 3, the pole faces of the two-pole stator each extend over nearly 180°.

The invention is obviously also applicable to stators having any numbers of poles P, in which case each pole shoe may have an angular extent in practice of nearly 360°/P. By this means, in the commutating or the periodical excitation of the stator winding, the desirable theoretical rectangular voltage is approached in the optimum manner.

What I claim is:
A self-starting, single-phase electric motor having:
(A) a diametrically magnetised rotor having polar axes;
(B) a substantially annular two-pole stator surrounding said rotor, said stator being split diametrically along the inter-pole axes thereof thus forming two gaps therebetween, said stator having poles arranged symmetrically in relation with the rotor; and boundary surfaces;
(C) air gaps between said stator and rotor;
(D) the reluctance of the boundary surfaces along said air gaps being less than that of the magnetic circuit intermediate the boundary surfaces of said stator.

References Cited by the Examiner
UNITED STATES PATENTS

| | | | |
|---|---|---|---|
| 2,073,526 | 3/1937 | Pestarini | 310—254 X |
| 2,453,359 | 11/1948 | Bertea | 310—254 |
| 3,059,131 | 10/1962 | Everard et al. | 310—156 X |
| 3,210,582 | 10/1965 | Miller | 310—156 |

ORIS L. RADER, *Primary Examiner.*
G. SIMMONS, *Assistant Examiner.*